(No Model.)
S. R. KRAMER.
BERRY OR FRUIT CRATE.
No. 378,098. Patented Feb. 21, 1888.
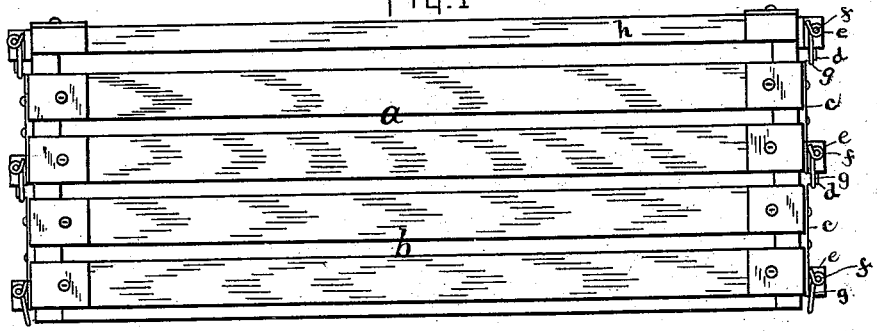
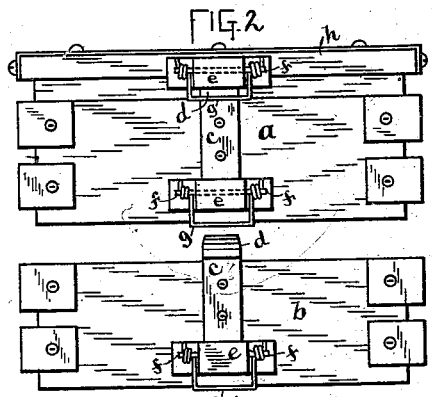
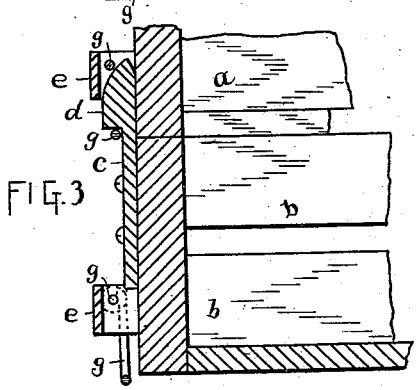
WITNESSES.
Geo. B. Fravel.
Ira C. Koehne.
INVENTOR.
Samuel R. Kramer
By his Atty.
C. C. Shepherd.

UNITED STATES PATENT OFFICE.

SAMUEL R. KRAMER, OF GAHANNA, OHIO.

BERRY OR FRUIT CRATE.

SPECIFICATION forming part of Letters Patent No. 378,098, dated February 21, 1888.

Application filed December 29, 1887. Serial No. 259,279. (No model.)

*To all whom it may concern:*

Be it known that I, SAMUEL R. KRAMER, a citizen of the United States, residing at Gahanna, in the county of Franklin and State of Ohio, have invented a certain new and useful Improvement in Berry or Fruit Crates, of which the following is a specification.

My invention relates to that class in which a number of berry or fruit trays are supported one above the other to form crates of various sizes, and has particular relation to the improvement of the means of connecting said trays or sections one with the other.

This improvement has special reference to the device described by me in a former application for patent under date of August 31, 1887, Serial No. 248,341.

The objects of my invention are to form a neat, effective, and inexpensive attachment to the trays of a crate; to so form said connection as to admit of two of said trays being disconnected independently of the remaining trays; to so form connecting latches or temporary locks for fruit or berry trays as to admit of their application to any of the ordinary forms of trays; by the use of said connection to admit of crates of any desired capacity being formed and held firmly together, and to simplify the construction and operation shown and described in said former application. These objects I accomplish in the manner illustrated in the accompanying drawings, in which—

Figure 1 is a side elevation of a crate of two sections having my improved catch applied thereto. Fig. 2 is an end view of the same, showing the trays separated, and Fig. 3 is an enlarged sectional view of a portion of one end of the crate.

Similar letters refer to similar parts throughout the several views.

*a* and *b* represent, respectively, berry or fruit trays, said trays being preferably formed, as shown, with slotted sides and bottoms and solid end pieces, although any ordinary form of tray may be used.

Secured by screws or otherwise to each end of each of the trays *a b* is a vertical metallic tongue-piece, *c*, having its lower end extending below the center of the height of the tray. The upper end of the tongue-piece *c* is allowed to project slightly above the top of the tray, and said projecting portion is formed with an outwardly-projecting lug or head, *d*, the top side of which is beveled inwardly, as shown.

From each end of each of the trays of the crate is made to project outwardly and bridge over the lower end of the tongue-piece *c* a metallic keeper or staple, *e*. Made to extend transversely through the upper portion of each of the keepers *e*, and having its end projecting through the sides thereof, is a metallic pin, *f*.

*g* represents a metallic spring-catch formed of suitable spring-wire, having its rear portions coiled, respectively, about the projecting ends of the pin *f*, while its ends are allowed to project upward a short distance. The main or central portion of this spring-wire is bent downwardly, as shown, said downwardly-bent portion being made to extend below the keeper for the purpose hereinafter described, and being urged against the side of the crate by the action of the spring.

The operation of the above-described device is as follows: Two trays being brought together so that the bottom of one will rest on the top of the other, the beveled upper end, *d*, of the tongue-piece *c* of the lower tray will force outward the spring-catch *g* until the tongue-head has entered the keeper of the upper tray a sufficient distance to cause the catch to drop, by tension of its coiled-spring ends, over said head, and thus hold the latter firmly in connection with the upper tray. A crate-lid or top piece, *h*, is adapted to fit over the top tray of the crate, and has on each end thereof one of the keepers *e* and spring-latches *g*, as described, for the trays. A crate having been formed of the desired size, this lid may be adjusted on the top tray and connected with said tray in the manner described for the connection of the trays. Although but two trays are shown in the drawings, it is obvious that any desired number may be used.

It will be observed that while the device herein described is simple of construction and operation, that a firm and secure connection is formed between the trays. When it is desired to disconnect the top or trays one from the other, the spring-catches may be raised sufficiently to release the connected tongue-heads and then allowed to drop back to their normal position.

Having now fully described my invention, what I claim, and desire to secure by Letters Patent, is—

1. A sectional berry or fruit crate having each of its trays provided with tongues c, having heads d and staples or keepers e, the latter having spring-bearing pins f and spring-latches g, substantially as and for the purpose specified.

2. In a sectional fruit or berry crate, the combination, with the trays having tongues c, provided with heads d and staples or keepers e, the latter having spring-bearing pins f and spring-latches g, of the lid h, having on each of its ends a staple or keeper, e, provided with pin f and spring-latch g, substantially as and for the purpose specified.

SAMUEL R. KRAMER.

In presence of—
C. W. ALLISON,
IRA C. KOEHNE.